(12) United States Patent
DiRisio

(10) Patent No.: US 6,208,808 B1
(45) Date of Patent: Mar. 27, 2001

(54) DEFORMATION SECURING LENS AND MOUNT ASSEMBLAGE

(75) Inventor: Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/505,101

(22) Filed: Feb. 16, 2000

(51) Int. Cl.$^7$ .................................................. G03B 17/02
(52) U.S. Cl. .............................. 396/6; 396/529; 359/819
(58) Field of Search .......................... 396/6, 529, 530, 396/531, 533; 359/811, 819

(56) References Cited

U.S. PATENT DOCUMENTS

| | | | |
|---|---|---|---|
| 4,737,017 | * 4/1988 | Nagasaka | 359/811 |
| 5,177,641 | * 1/1993 | Kobayashi et al. | 359/819 |
| 5,239,326 | 8/1993 | Takai | 396/6 |
| 5,555,062 | 9/1996 | Pearson et al. | 396/6 |
| 5,608,486 | 3/1997 | Takagi et al. | 396/6 |
| 5,615,395 | 3/1997 | Komaki et al. | 396/6 |
| 5,623,702 | 4/1997 | Pearson | 396/6 |
| 5,630,177 | 5/1997 | Yamada et al. | 396/6 |
| 5,642,235 | 6/1997 | Ichikawa | 359/811 |
| 5,659,803 | 8/1997 | Takagi et al. | 396/6 |
| 5,754,350 | 5/1998 | Sato | 359/819 |
| 5,768,649 | 6/1998 | Pearson | 396/529 |
| 5,969,887 | * 10/1999 | Hagimori et al. | 359/819 |

FOREIGN PATENT DOCUMENTS 8211564  8/1996 (JP).

\* cited by examiner

Primary Examiner—David M. Gray
(74) Attorney, Agent, or Firm—Roger A. Fields

(57) ABSTRACT

A lens and mount assemblage includes a lens and a mount for the lens which are secured to one another. The mount has elastic retaining members constructed to be deformed against the lens to secure the lens to the mount. A front cover part that fits over the lens and the mount has rigid deforming members arranged to deform the retaining members against the lens when the front cover part is fit over the lens and the mount.

9 Claims, 5 Drawing Sheets

DEFORMATION SECURING LENS AND MOUNT ASSEMBLAGE

CROSS REFERENCE TO RELATED APPLICATION

Reference is made to commonly assigned copending application Ser. No. 09/504,446, entitled ROTARY ENGAGING LENS AND MOUNT ASSEMBLAGE and filed Feb. 16, 2000 in the names of Anthony DiRisio and Joel S. Lawther.

FIELD OF THE INVENTION

The invention relates generally to the field of photography, and in particular to deformation securing lens and mount assemblage for a camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed filmstrip substantially prewound from a film take-up spool in the film cartridge onto a film supply spool in a film supply chamber in order to form an unexposed film roll on the film supply spool, a fixed-focus taking lens, a film metering mechanism with a rotatably supported metering sprocket that engages the filmstrip, a manually rotatable film winding thumbwheel coaxially engaged with the film take-up spool in the film cartridge, a single-blade shutter for exposing successive frames of the filmstrip, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film take-up spool in the film cartridge. This winds an exposed frame of the filmstrip from a rear backframe (exposure) opening in the main body part into the film cartridge, and advances an unexposed frame of the filmstrip from the unexposed film roll to the backframe opening. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel. When the metering lever engages the thumbwheel, further rotation of the thumbwheel is prevented. Manually depressing the shutter release button to take another picture pivots the metering lever out of engagement with the thumbwheel to permit renewed rotation of the thumbwheel. After the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the negatives and make prints for the customer. Most of the used parts such as the electronic flash can be recycled, i.e. reused, to remanufacture the one-time-use camera.

PRIOR ART PROBLEM

During original manufacture or remanufacture of the one-time-use camera, the taking lens must be secured to a mount for the lens. This must be done in a way that assures the lens is held fast to the mount.

By way of example, U.S. Pat. No. 5,642,235 issued Jun. 24, 1997 discloses a rotary securing lens and mount assemblage comprising a lens which has a central imaging portion and a circular rim portion with several engaging portions, and a mount for the lens which has several engageable portions equal in number to the engaging portions to engage with the respective engaging portions when the lens is rotated relative to the mount.

Commonly assigned U.S. Pat. No. 5,768,649 issued Jun. 16, 1998 discloses a lens and mount assemblage comprising a mount for the lens which has several engageable holes, and a retainer which has several engaging hooks that enter the respective holes to hold the lens between the retainer and the mount.

THE CROSS-REFERENCED APPLICATIOn

The cross-referenced application discloses a rotary securing lens and mount assemblage that includes a lens and a mount for the lens which are secured to one another when the lens is rotated relative to the mount. The lens has at least one cutting edge which is shaped to cut into the mount in order for the lens and the mount to become mutually engaged to be secured to one another when the lens is rotated.

SUMMARY OF THE INVENTION

A lens and mount assemblage comprising a lens and a mount for the lens, is characterized in that:

the mount has elastic retaining members constructed to be deformed against the lens to secure the lens to the mount; and a front cover part that fits over the lens and the mount has rigid deforming members arranged to deform the retaining members against the lens when the front cover part is fit over the lens and the mount.

DETAILED DESCRIPTION OF THE INVENTION

Figure 1:
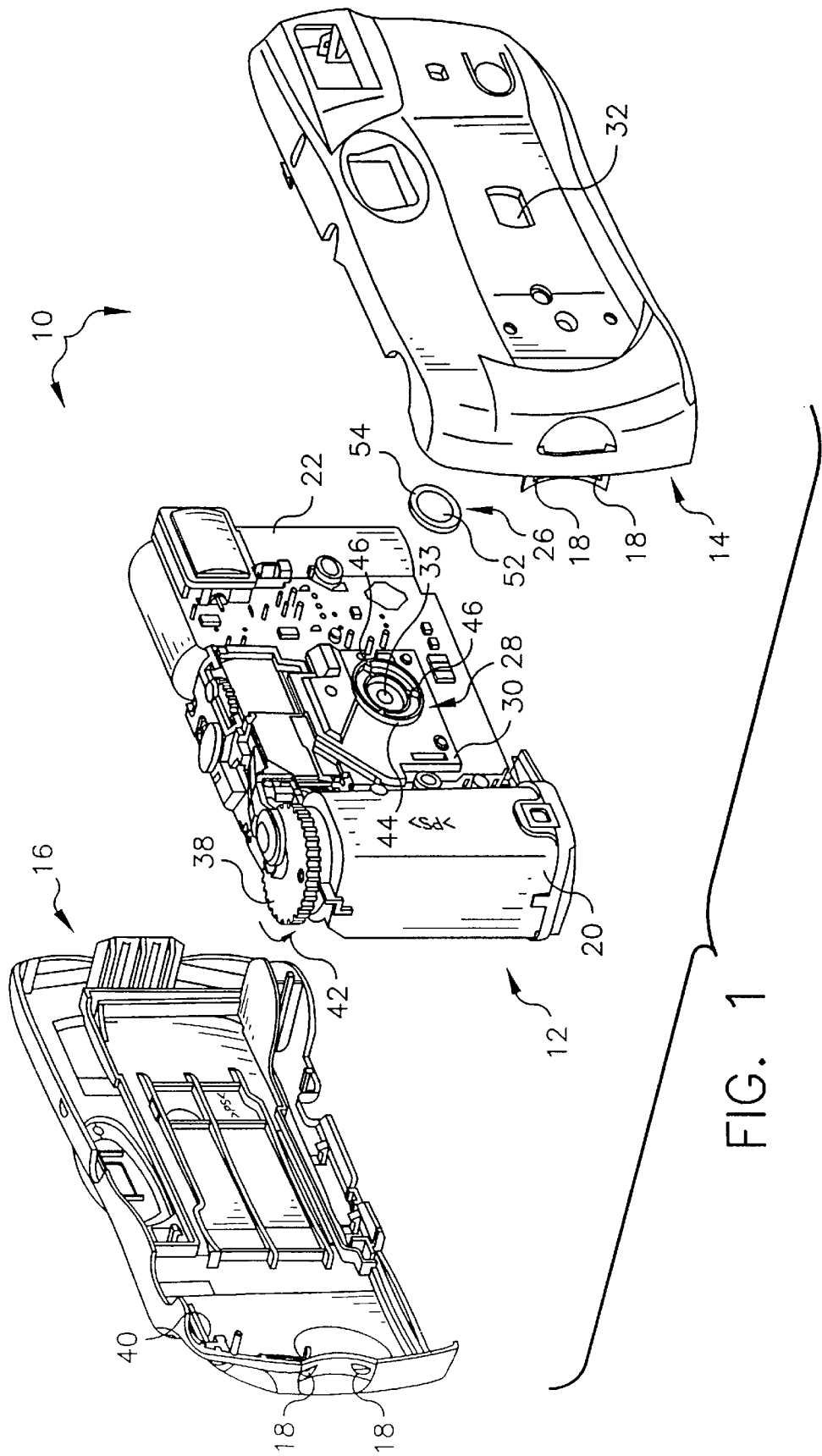
FIG. 1 is an exploded front perspective view of a one-time-use camera that includes a lens and mount assemblage according to a preferred embodiment of the invention.
Figure 2:
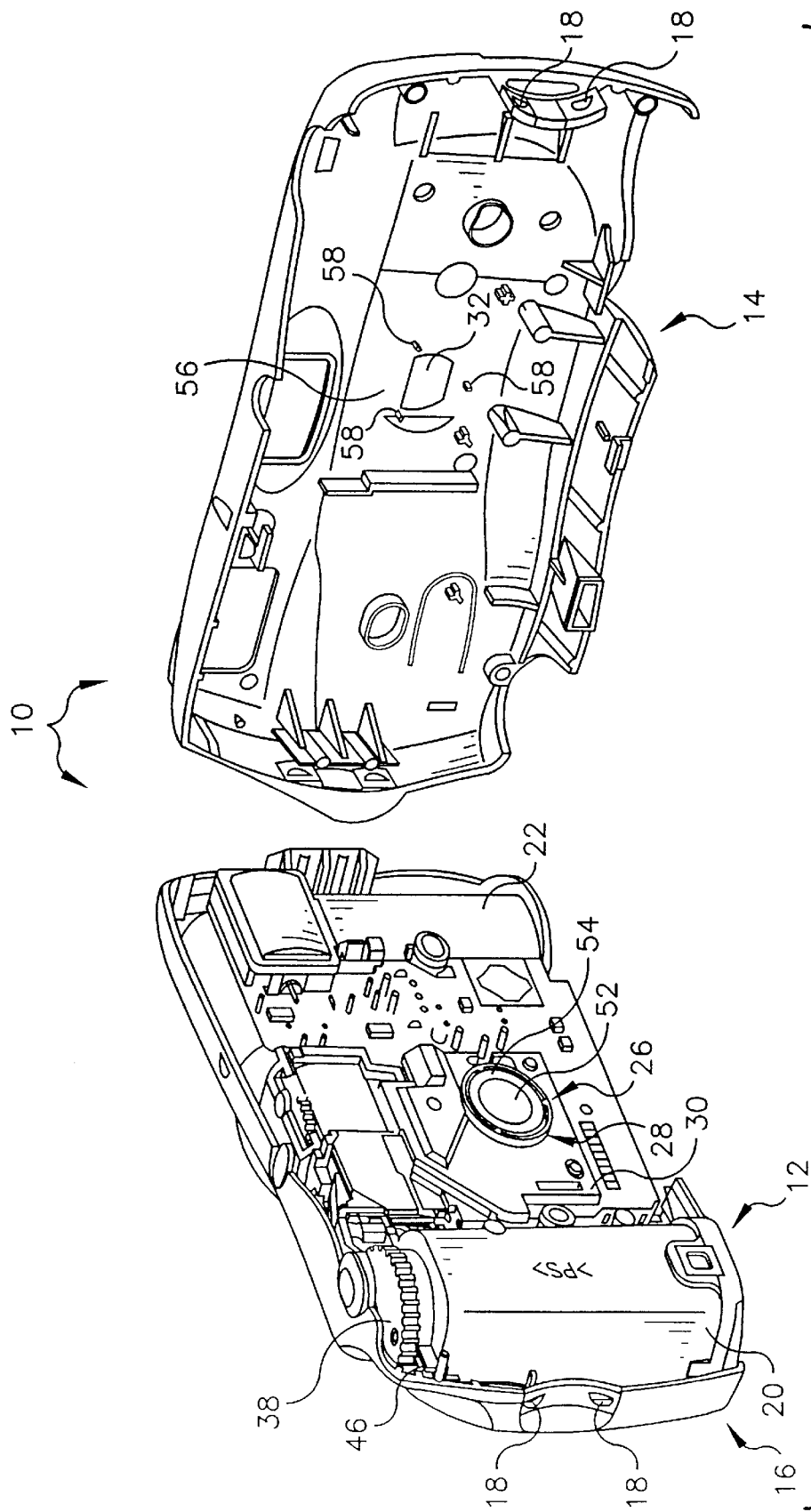
FIG. 2 is a partially assembled perspective view of the camera, showing the inside of a front cover part.

The invention is disclosed as being embodied preferably in a one-time-use camera. Because the features of a onetime-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known flexible hook-in-hole connections 18.

Figure 5:
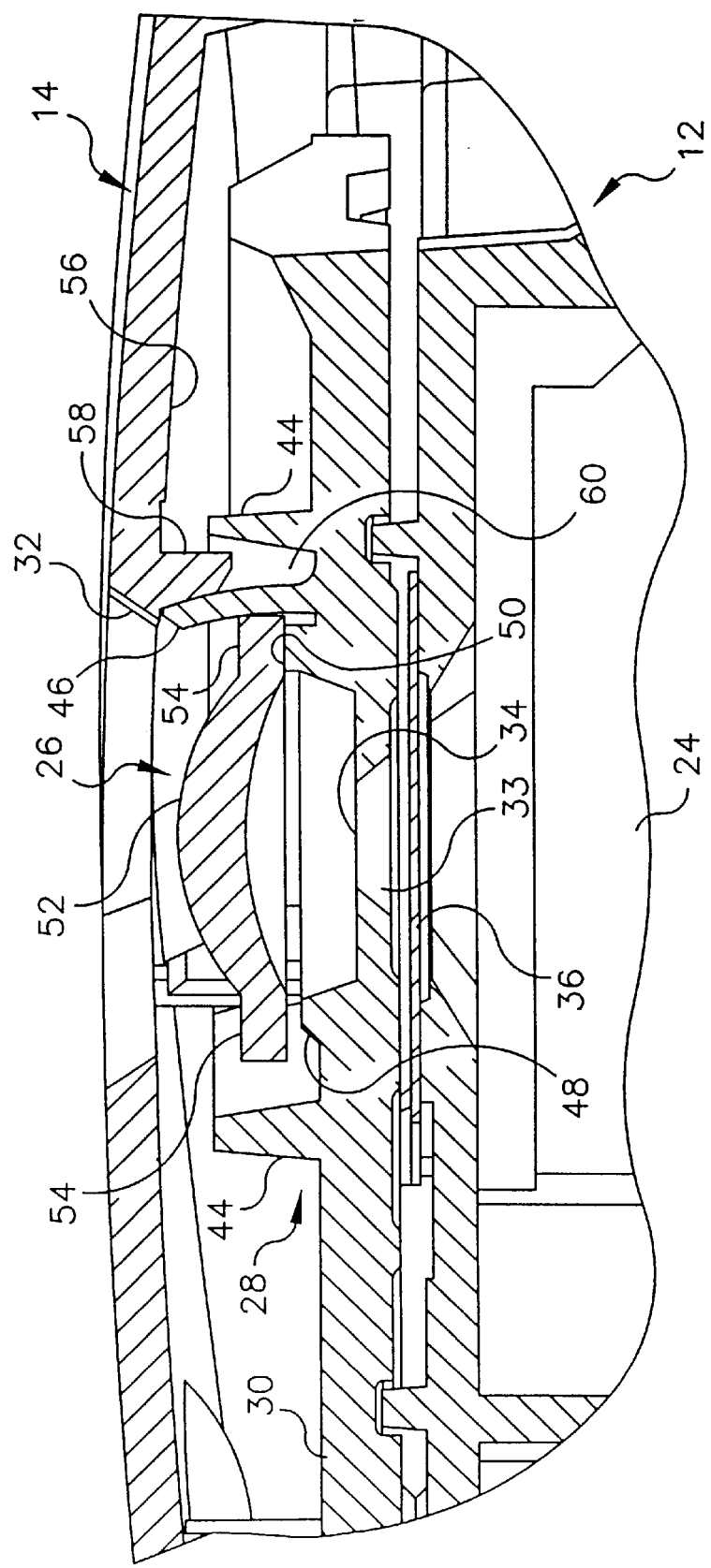
FIG. 5 is a sectional view of the lens and mount assemblage.

As is typical, the main body part 12 has a rearwardly open cartridge receiving chamber 20 for a film cartridge (not shown) and a rearwardly open film supply chamber 22 for an unexposed filmstrip (not shown). See FIGS. 1 and 2. The unexposed filmstrip, except for a trailing end portion originally wound on a film take-up spool in the film cartridge is substantially pre-wound into an unexposed film roll in the film supply chamber 22 during manufacture of the one-time-use camera 10. A rearwardly open, rectangular-shaped backframe (exposure) opening 24, shown in FIG. 5, is located between the cartridge receiving chamber 20 and the film supply chamber 22 for exposing successive frames of the filmstrip when ambient light is received through a front taking lens 26. The front taking lens 26 is secured to a mount 28 for the lens which is integrally formed with a lens plate 30 connected to the main body part 12. The light is received through a front lens opening 32 in the front cover part 14, through the front taking lens 26, through a light admitting opening 33 in a bottom 34 of the mount 28, and into the backframe opening 24. See FIG. 5. A shutter blade 36 which normally blocks the light-admitting opening 33 is momentarily pivoted open to allow the light to enter the backframe opening 24 via the light-admitting opening.

A manual film winder or film winding thumbwheel 38, rotatably supported on the main body part 12, above the cartridge receiving chamber 20, radially protrudes partially from an elongate narrow opening 40 in the rear cover part 16 and has a depending coaxial stem (not shown) in coaxial engagement with an exposed top end of the film take-up spool in the film cartridge. The film winding thumbwheel 38 is manually grasped or fingered to rotate the thumbwheel in a film winding direction 42, i.e. counter-clockwise in FIGS. 1 and 2, to rotate the film take-up spool in the same direction. The thumbwheel 38 is incrementally rotated decreasing angles of rotation to incrementally rotate the film take-up spool the same decreasing angles in order to wind the respective frames of the filmstrip from the unexposed film roll in the film supply chamber 22, to the backframe opening 24 for exposure, and then onto the film take-up spool. The film take-up spool must be rotated the decreasing angles to wind the respective frames onto the spool, because the resulting film roll (not shown) on the spool increases in diameter with each added frame.

Figure 3:
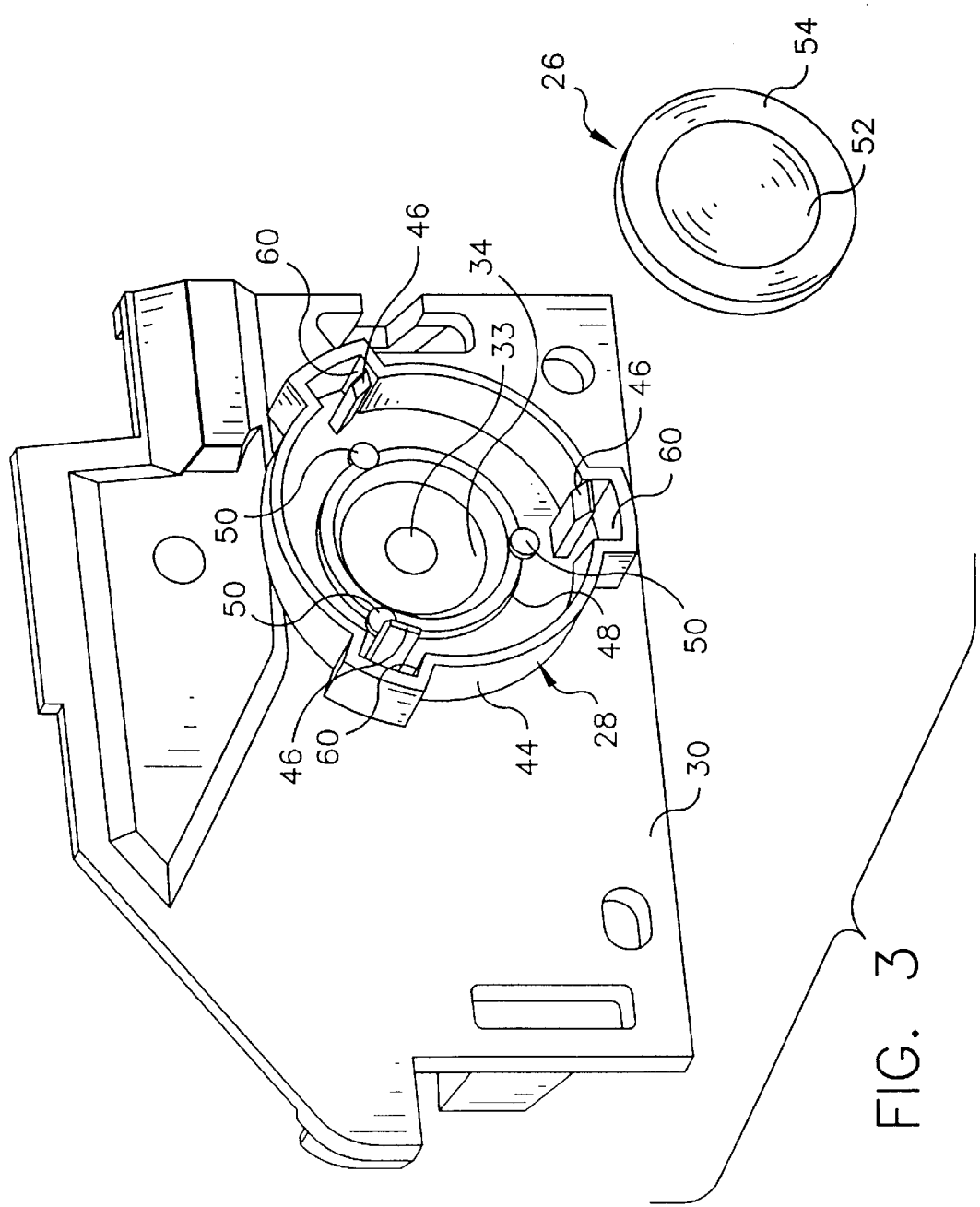
FIG. 3 is an exploded front perspective view of the lens and the mount for the lens.
Figure 4:
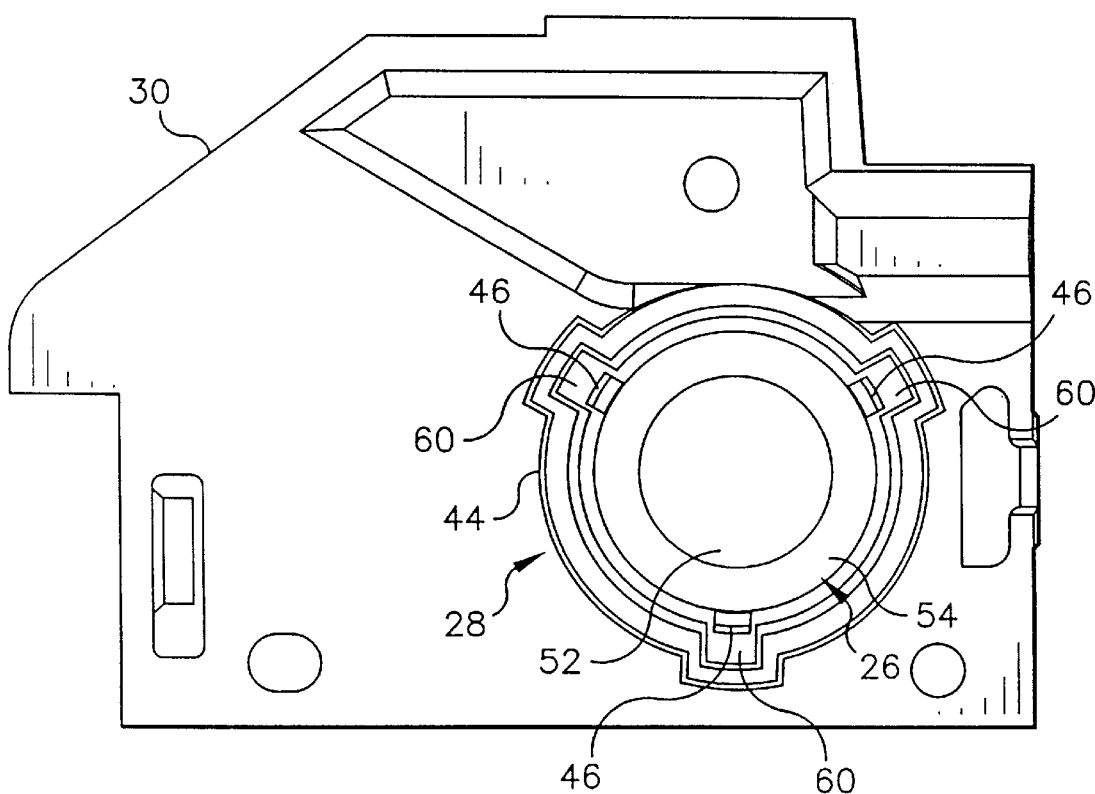
FIG. 4 is a front elevation view of the lens and the mount for the lens.

The mount 28 for the front taking lens 26 has a circular peripheral rib 44 with three evenly spaced (120° apart) elastic, i.e. flexible, retaining members or projections 46, and an inner circular ring 48 with three raised pads 50 positioned adjacent the respective retaining members as shown in FIGS. 1–5. The three elastic retaining members 46 are each inherently biased upright and parallel to one another as shown in FIGS. 3 and 4 to have a tendency to straighten out, and can each be deformed (bent in opposition to their tendency to straighten out) radially inward of the circular peripheral rib 44 as shown in FIG. 5.

The front taking lens 26 has a central imaging portion 52 and a circular rim portion 54. See FIGS. 1–5.

The front cover part 14 has on its inner side 56 three evenly spaced (120° apart) rigid deforming members or wedges 58. See FIGS. 2 and 5. The three rigid deforming members 58 project parallel to one another.

During manufacture of the one-time-use camera 10, the front taking lens 26 is placed on the three raised pads 50 of the mount 28 to position the circular rim portion 54 of the lens radially inward of the three elastic retaining members 46 of the mount. See FIGS. 1–5. Then, the front cover part 14 is fit over the taking lens 26 and the mount 28 as shown in FIG. 5.

When the front cover part 14 is fit over the taking lens 26 and the mount 28 as shown in FIG. 5, the three rigid deforming members 58 of the front cover part are inserted into respective concavities 60 at the peripheral circular rib 44 of the mount 28 to deform (bend) the three elastic retaining members 46 of the mount radially inward firmly against the circular rim portion 54 of the lens. This secures the taking lens 26 to the mount 28. Then, the front cover part 14 is connected to the rear cover part 16 at the hook-in-hole-connections 18.

The retaining members 46 are biased upright to be in the way of the deforming members 58 when the front cover part 14 is fit over the lens 26 and the mount 28, to enable the deforming members to deform the retaining members at least to the circular rim portion 54 when the front cover part is fit over the lens and the mount. See FIGS. 3–5.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. hook-in-hole connections
20. cartridge receiving chamber
22. film supply chamber
24. backframe opening
26. front taking lens
28. mount
30. lens plate
32. front lens opening
33. light-admitting opening
34. bottom
36. shutter blade
38. thumbwheel
40. narrow opening
42. film winding direction
44. circular peripheral rib
46. elastic retaining members
48. inner circular rib
50. raised pads
52. central imaging portion
54. circular rim portion
56. inner side
58. rigid deforming members
60. concavities

What is claimed is:
1. A lens and mount assemblage comprising a lens and a mount for said lens, is characterized in that:

said mount has a plurality of evenly spaced elastic flexible retaining members each constructed to be deformed by bending against said lens to secure said lens to said mount; and a front cover part fits over said lens and said mount, and has respective evenly spaced rigid deforming members arranged to deform said retaining members by bending the retaining members against said lens when said front cover part is fit over said lens and said mount.

2. A lens and mount assemblage as recited in claim 1, wherein said front cover part has an opening for said lens.

3. A lens and mount assemblage as recited in claim 1, wherein said lens has a central imaging portion and a circular rim portion, and said deforming members deform said retaining members at least to said circular rim portion to secure said lens to said mount.

4. A lens and mount assemblage as recited in claim 3, wherein said retaining members are biased upright to be in the way of said deforming members when said front cover part is fit over said lens and said mount, to enable said deforming members to deform said retaining members at least to said circular rim portion when said front cover part is fit over said lens and said mount.

5. A lens and mount assemblage as recited in claim 3 wherein said mount includes individual discrete pads adjacent the respective retaining members, and said circular rim portion rests on said pads to support said circular rim portion for said retaining members lens to be deformed at least to said circular rim portion.

6. A lens and mount assemblage as recited in claim 1, wherein said mount has a circular peripheral rib which surrounds said lens and said retaining members, and said deforming members deform said retaining members radially inward of said circular peripheral rib.

7. A lens and mount assemblage as recited in claim 6, wherein said circular peripheral rib includes individual concavities arranged to receive the respective deforming members when said front cover part is fit over said lens and said mount.

8. A lens and mount assemblage comprising a lens and a mount for said lens which are secured to one another, is characterized in that:

said mount has a plurality of spaced elastic flexible retaining members that are each deformed, in opposition to a tendency to straighten out, by being bent firmly against said lens to secure said lens to said mount; and a front cover part with an opening for said lens is fit over said lens and said mount, and has respective rigid deforming members that deform said retaining members only by holding the retaining members bent against said lens in opposition to the tendency of the retaining members to straighten out.

9. A method of securing a lens and a mount for the lens to one another, comprising the steps:

placing the lens between elastic flexible retaining members of a mount that are each constructed to be deformed, in opposition to a tendency to straighten out, by being bent against the lens to secure the lens to the mount; and fitting a front cover part with an opening for the lens over the lens and the mount, and positioning rigid deforming members of the front cover part to deform the retaining members against the lens by bending the retaining members against said lens in opposition to the tendency of the retaining members to straighten out.

\* \* \* \* \*